July 13, 1954
R. V. KLIX
2,683,440
BIRD FEEDER
Filed March 3, 1953
2 Sheets-Sheet 1
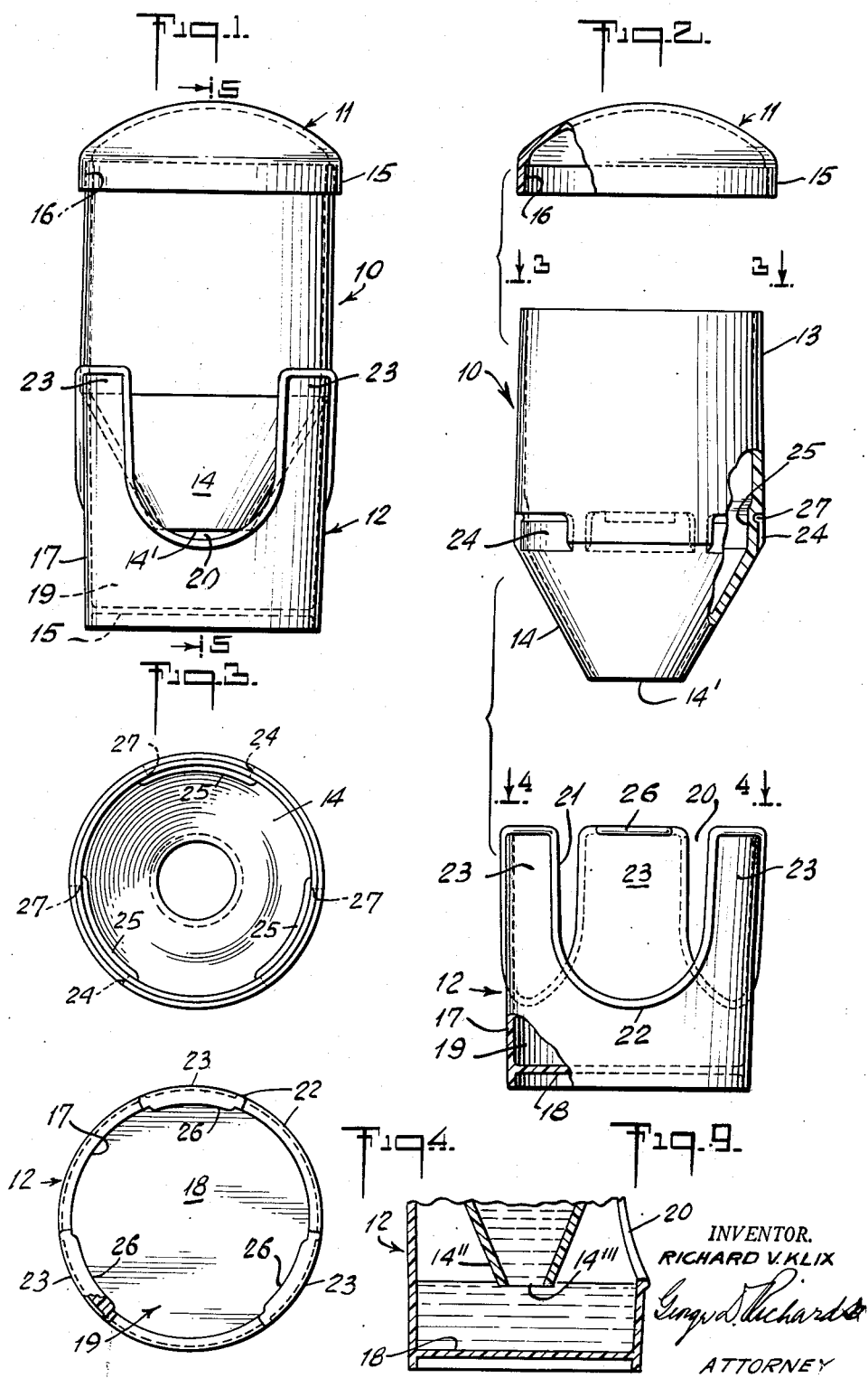
INVENTOR.
RICHARD V. KLIX
ATTORNEY July 13, 1954  R. V. KLIX  2,683,440
BIRD FEEDER
Filed March 3, 1953  2 Sheets-Sheet 2
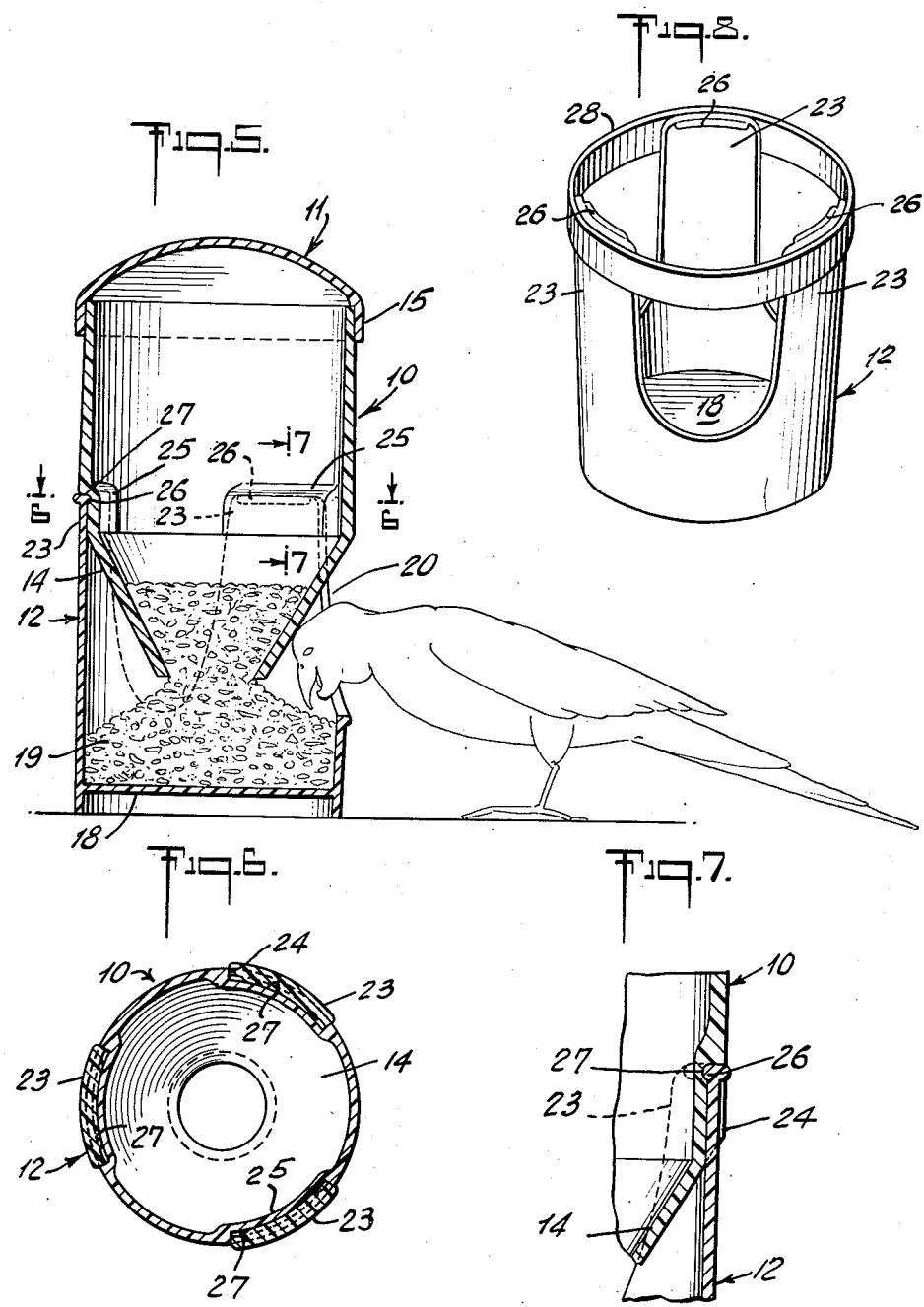
INVENTOR:
RICHARD V. KLIX
BY
ATTORNEY:

Patented July 13, 1954

2,683,440

UNITED STATES PATENT OFFICE 2,683,440

BIRD FEEDER

Richard V. Klix, Montclair, N. J.

Application March 3, 1953, Serial No. 340,045

4 Claims. (Cl. 119—52)

This invention relates to a bird feeder and drinking fountain and particularly to a device of this character having a relatively large hopper for storage and from which feed or water is automatically supplied to a tray or other container to which the bird has access.

Seeds, which normally constitute a bird's diet have shells which the bird must crack open to get at the kernel. The shells are discarded. There are feeders with reservoirs for relatively large supplies of seed, say for a few days, but such feeders have been so constructed that the bird may discard or drop the shells on top of the unconsumed seed. When good seed has been covered by discarded shells, the bird no longer is interested in what the feeder contains. Accordingly, the feed must be replenished even though a large supply of unconsumed food still remains in the feeder. Waste of food and much loss of time in refilling the feeder results.

According to the present invention, there is provided a feeder having a reservoir for a substantial supply of seed which automatically feeds into an underlying tray or container to which access is given through an aperture or series of apertures. The feeder is so designed that the bird after lowering its head to pick up a seed, encounters an overlying portion of the reservoir as it raises its head to crack open the shell. This causes the bird to move back clear of the container so that the discarded shell falls outside. The good seeds in the underlying container thus are never covered by discarded shells and the bird will continue to eat from the feeder so long as edible food remains therein. Waste of food as well as time for the care of the bird is substantially diminished. The upper hopper section of the lower tray section are detachable to facilitate cleaning the parts as well as to fill the hopper when the device is designed as a drinking fountain.

A better understanding of the invention may be had by reference to the following detailed description in conjunction with the accompanying drawings of which:

Fig. 1 is an elevation of a bird feeder equipped with the present improvements;

Fig. 2 is an exploded view of the feeder illustrated in Fig. 1, showing the manner in which the parts are associated together;

Fig. 3 is a view on line 3—3 of Fig. 2 looking at the top of one element of the feeder;

Fig. 4 is a view on line 4—4 of Fig. 2 looking at the top of another element of the feeder;

Fig. 5 is a vertical sectional view on line 5—5 of Fig. 1;

Fig. 6 is a horizontal sectional view on line 6—6 of Fig. 5;

Fig. 7 is an enlarged vertical sectional view on line 7—7 of Fig. 5;

Fig. 8 is a partial view in perspective of a modified construction for connecting the upper and lower parts of the device together; and Fig. 9 is a fragmental vertical sectional view through the lower portion of a feeder designed for liquid instead of seed.

The feeder, according to the preferred embodiment of this invention, includes a hopper 10, a cap 11, and an underlying base 12, all preferably molded of suitable transparent plastic material. The hopper has a hollow upper section 13 substantially cylindrical in shape and a hollow lower section 14 having an opening 14' at the bottom, formed integral with the upper section and which is substantially frustro-conical in shape (Figs. 1, 2, 3 and 4).

The closing cap member 11 has a depending vertical flange 15 with internal rabbit 16 snugly to receive and fit over the top edge of the hopper. The cap may be removable from the hopper when the food to be dispensed is dry such as seed or may be sealed to the body member when the material to be dispensed is a liquid.

The base 12 of the feeder includes a wall member 17 generally cylindrical in shape and a bottom or floor member 18 which may be integral with the wall to provide a feeding chamber 19. The wall, at suitable intervals say about 120°, is cut away to provide apertures 20 which give access for the birds to the feeding chamber 19 beneath the feed hopper (see also Fig. 5). The apertures 20 have side edges 21 extending downwardly from the top edge of the base section and merging into a semi-circular connecting edge 22 forming the bottom edge of the aperture. The aperture arrangement just described leaves substantially vertical cylindrical wall portions 23 between the access apertures 20 which serve as standards to support the overlying feed hopper.

The access apertures and the intermediate sections between them may be formed with a bead to give rigidity to the parts. These intermediate sections 23, at their upper ends, fit into recesses 24 provided for the purpose in the feed hopper at the base of the cylindrical portion thereof just above the frustro-conical section 14 (Figs 1, 3, 5, 6 and 7). At these regions of the feed hopper there is formed an internal boss 25 providing a thickened wall section to accommodate the recess 24 into which the vertical sections 23 of the base support telescope. The bottom tray supporting part of the feeder is designed for detachability from the hopper section, but to prevent the parts from inadvertently coming apart when the feeder is in use, a boss in the nature of a horizontal tongue 26 on the inner face of each vertical section of the base at the upper edge thereof, snaps into a complementary groove 27 provided for the purpose in the surface of the recess when the ends of the vertical sections are slid therein. (See also Fig. 4.) Sufficient resiliency is built into the vertical supporting sections to hold the parts together when the tongue 26 have snapped into the grooves 27.

In an alternate modification of this part of the structure shown in Fig. 8, a relatively narrow circular ring 28 may be fixed externally to the vertical supporting sections 23 to insure that they will nest relatively tightly into the recesses 24. The ability of the arcuate sections of the ring 28 spanning the distance between the edges of the vertical section, partially to straighten out will facilitate the telescoping action necessary to connect and disconnect the parts (Fig. 8).

The bottom edge 22 of the access aperture is above the floor of the base section a distance sufficient to accommodate an appropriate volume of seed or liquid in the chamber. In the case of seeds, the lower open end of the frustro-conical section terminates somewhat higher than the lower edge of the access aperture (Fig. 5) whereas when the device is designed for liquid (Fig. 9) such lower end (herein designated 14''') of the frustro-conical section section 14'') terminates just below the lower edge of the access aperture.

As previously stated, when the feeder is designed for solid food, it is preferred that the cap be removable to facilitate filling from the top. When it is designed as a fountain in which case the cap is sealed on, the lower supporting section is removed to facilitate filling through the opening at the bottom of the hopper. In either case the ability to separate the sections and the simplicity of their construction when separated greatly facilitates cleaning of the parts.

It should be noted that the frustro-conical section 14 of the hopper constitutes a sloping roof for the feeding chamber whose upper edge constitutes the top edge of the access opening. According to the size of the bird for which the feeder is to be used, the position of the roof, when the feeder is at the level of the bird's feet, is such that the bird must lower its head to pick up a seed and must step back to move its head clear of the feeding chamber when it raises its head to crack the seed shell. The shell thus automatically is dropped outside the feeding chamber. The construction is such too, that a bird cannot perch on the edge of the access chamber or, in the normal course of events, insert any part of its body, except the head, into the feeding chamber. The result is that while the bird has access to every part of the feeding chamber so far as obtaining food or water is concerned, it nevertheless is barred from such acts as inevitably would render the food or water unsanitary. Several days supply of food or water may thus be left for the bird without danger to its health or that it will go hungry or thirsty.

The invention has been described in connection with one embodiment thereof but many modifications are included within its spirit. It is to be limited therefore only by the scope of the appended claims.

What is claimed is:

1. A bird feeder comprising a cylindrical hopper section having a frustro-conical lower end portion provided with a terminal discharge opening, a separable feeding compartment telescopically engageable with the hopper section, the side walls of said feeding compartment being indented by upwardly open access openings spaced by intervening resilient wall portions, means to detachably interlock said feeding compartment and hopper section in coupled together assembled relation, said latter means comprising inwardly projecting coupler tongues bordering the upper ends of said resilient wall portions of the feeding compartment, and the walls of said hopper section, above its frustro-conical lower end portion, having socket grooves indenting the external surface thereof, and spaced around the same for alignment with the resilient wall portions of the feeding compartment, into which said coupler tongues of the latter can be sprung when the feeding compartment is telescopically engaged over the hopper section, the access openings of the feeding compartment, when thus coupled to the hopper section, being adjacently opposed to the frustro-conical lower end portion of the latter.

2. A bird feeder as defined by claim 1, wherein the margins of the resilient wall portions of the feeding compartment, by which its access openings are defined, are provided with reenforcing beads.

3. A bird feeder comprising a cylindrical hopper section having a frustro-conical lower end portion provided with a terminal discharge opening, a separable feeding compartment telescopically engageable with the hopper section, the side walls of said feeding compartment being indented by upwardly open access openings spaced by intervening resilient wall portions, means to detachably interlock said feeding compartment and hopper section in coupled together assembled relation, said latter means comprising inwardly projecting coupler tongues bordering the upper ends of said resilient wall portions of the feeding compartment, and the walls of the hopper section, above its frustro-conical lower end portion, having outwardly and downwardly open recesses to receive the free end parts of the resilient wall portions of the feeding compartment, said recesses being provided at their upper inner ends with socket grooves into which the coupler tongues of the resilient wall portions of the feeding compartment can be sprung when said feeding compartment is telescopically engaged over the hopper section, the access openings of the feeder compartment, when thus coupled to the hopper section, being adjacently opposed to the frustro-conical lower end portion of the latter.

4. A bird feeder as defined by claim 3, wherein the margins of the resilient wall portions of the feeding compartment, by which its access openings are defined, are provided with reenforcing beads.

References Cited in the file of this patent

UNITED STATES PATENTS

| Number | Name | Date |
|---|---|---|
| 581,952 | Amos | May 4, 1897 |
| 980,496 | Crockford | Jan. 3, 1911 |
| 1,091,392 | Schlichtinger | Mar. 24, 1914 |
| 1,113,842 | Sill | Oct. 13, 1914 |
| 1,460,702 | Caltrider et al. | July 3, 1923 |
| 1,485,469 | Riegel | Mar. 4, 1924 |
| 1,491,317 | Schultz | Apr. 22, 1924 |
| 1,566,571 | Appleton | Dec. 22, 1925 |
| 1,834,516 | Dains | Dec. 1, 1931 |
| 2,602,420 | Peterson | July 8, 1952 |

FOREIGN PATENTS

| Number | Country | Date |
|---|---|---|
| 180,184 | Great Britain | May 25, 1922 |
| 600,335 | France | Nov. 4, 1925 |